United States Patent
Vinuchackravarthy et al.

(10) Patent No.: US 12,131,440 B2
(45) Date of Patent: Oct. 29, 2024

(54) METHOD AND APPARATUS FOR GENERATING TRAINING DATA OF DEEP LEARNING MODEL FOR LANE CLASSIFICATION

(71) Applicant: HL Klemove Corp., Incheon (KR)

(72) Inventors: S Vinuchackravarthy, Pyeongtaek-si (KR); Shubham Jain, Pyeongtaek-si (KR); Arpit Awasthi, Pyeongtaek-si (KR); Jitesh Kumar Singh, Pyeongtaek-si (KR)

(73) Assignee: HL Klemove Corp., Incheon (KR)

( * ) Notice: Subject to any disclaimer, the term of this patent is extended or adjusted under 35 U.S.C. 154(b) by 313 days.

(21) Appl. No.: 17/720,740

(22) Filed: Apr. 14, 2022

(65) Prior Publication Data
US 2022/0335584 A1    Oct. 20, 2022

(30) Foreign Application Priority Data
Apr. 16, 2021    (KR) ........................ 10-2021-0049717

(51) Int. Cl.
*G06T 5/50*    (2006.01)
*G06N 3/08*    (2023.01)
*G06T 3/40*    (2006.01)

(52) U.S. Cl.
CPC ............... *G06T 5/50* (2013.01); *G06N 3/08* (2013.01); *G06T 3/40* (2013.01); *G06T 2207/10024* (2013.01); *G06T 2207/20216* (2013.01); *G06T 2207/30256* (2013.01)

(58) Field of Classification Search
None
See application file for complete search history.

(56) References Cited

U.S. PATENT DOCUMENTS

| | | | | |
|---|---|---|---|---|
| 7,421,094 B2 * | 9/2008 | Ikeda | ........................ | G06T 7/73 |
| | | | | 701/28 |
| 7,421,095 B2 * | 9/2008 | Ikeda | ....................... | H04N 7/18 |
| | | | | 701/28 |
| 9,690,995 B2 * | 6/2017 | Tamura | ................. | G06V 20/588 |
| 10,691,959 B2 * | 6/2020 | Kumano | ................... | G06T 7/12 |
| 10,843,730 B2 * | 11/2020 | Kataoka | ................ | B60W 50/06 |
| 10,990,815 B2 * | 4/2021 | Hou | .................... | G06V 20/588 |
| 11,023,745 B2 * | 6/2021 | Hou | .................... | G01C 21/3602 |
| 11,989,857 B2 * | 5/2024 | Suzuki | ....................... | G06T 5/50 |

(Continued)

*Primary Examiner* — Anand P Bhatnagar
(74) *Attorney, Agent, or Firm* — Hauptman Ham, LLP

(57) ABSTRACT

The present disclosure relates to a method and apparatus for generating training data of a deep learning model for lane classification. The method according to an embodiment of the present disclosure is performed by an electronic apparatus, and is a method for generating training data of a deep learning model for lane classification by generating a composite image of the other color lane using images of a white lane and the other color lane, and includes determining a ratio of other two channels based on one channel (reference color channel) for three color channels of red (R), green (G) and blue (B) of the other color lane in the image of the other color lane; and generating a composite image of the other color lane by scaling the image of the white lane by applying the determined ratio to the other two channels with respect to the reference color channel of the white lane.

16 Claims, 11 Drawing Sheets

(56) References Cited

U.S. PATENT DOCUMENTS

| | | | | |
|---|---|---|---|---|
| 2007/0225913 A1* | 9/2007 | Ikeda | ............ | G06T 7/60 |
| | | | | 382/104 |
| 2015/0371093 A1* | 12/2015 | Tamura | ............ | G06T 7/593 |
| | | | | 382/103 |
| 2018/0154938 A1* | 6/2018 | Kataoka | ............ | B60W 30/12 |
| 2020/0210696 A1* | 7/2020 | Hou | ............ | G06V 10/242 |
| 2021/0217304 A1* | 7/2021 | Shino | ............ | G08G 1/123 |

* cited by examiner

METHOD AND APPARATUS FOR GENERATING TRAINING DATA OF DEEP LEARNING MODEL FOR LANE CLASSIFICATION

CROSS-REFERENCE TO RELATED APPLICATION

This application claims priority to and the benefit of Korean Patent Application No. 10-2021-0049717, filed on Apr. 16, 2021, the disclosure of which is incorporated herein by reference in its entirety.

TECHNICAL FIELD

The present disclosure relates to a method and apparatus for generating training data of a deep learning model for lane classification, and more particularly, to a method and apparatus for increasing training data of an unbalanced number of lanes.

BACKGROUND

An intelligent vehicle is a vehicle including an autonomous driving system and the like, and refers to a vehicle in which driving operations such as driving, stopping, rotating, accelerating or decelerating are automatically performed by a computer or the like without a driver directly operating the vehicle. The main tasks of such an intelligent vehicle include maintaining a driving lane, securing a safe distance from adjacent vehicles, detecting nearby obstacles and avoiding collisions, and controlling vehicle speed according to traffic conditions or road environments.

Recently, with the advancement of information and communication technology, a safe driving assistance system such as a lane departure warning system (LDWS) or lane keeping, an automatic vehicle control system, and the like have been developed, and thus commercialization thereof is rapidly progressing. In particular, lane recognition is one of the core technologies in intelligent vehicles, and many studies are being actively conducted in international interest.

Since lane recognition greatly affects safe driving, various sensors are used to estimate and determine the location of the lane. That is, various sensors, such as an image sensor, a radar, or a lidar sensor, implement an intelligent vehicle control system in a single or fused form for lane recognition or object recognition in front of a vehicle. Among them, lane recognition using an image sensor is widely used because it can provide a lot of information at a low cost and utilize various existing vision processing algorithms.

Meanwhile, lanes on the road are marked with various colors, and have various traffic sign functions according to the color and type. For example, a white lane, a yellow lane, a blue lane, etc. have various traffic sign functions such as a one-way lane, a two-way lane, and a special lane according to their colors.

Therefore, accurate classification of these lane colors and types is essential in intelligent vehicles. Lane classification based on these colors can be achieved using balanced training data for each lane color and state-of-the-art deep learning models.

However, on an actual road, white lanes are frequent, while yellow lanes and blue lanes are very few and thus the number is unbalanced. That is, for lane classification learning, it is impossible to collect the same amount of training data for lanes of each color only with images of actual roads. In the case of a deep learning model trained with such unbalanced training data, it is inevitably biased to frequently occurring scenarios, and thus the accuracy of the classification is inevitably lowered.

The above information disclosed in this Background section is only for enhancement of understanding of the background of the disclosure and it may therefore contain information that does not form the prior art that is already known to a person of ordinary skill in the art.

SUMMARY

Technical Problem

The present disclosure is directed to providing a technique for generating training data of a deep learning model for lane classification capable of increasing training data of an unbalanced number of lanes.

The technical problems to be achieved in the present disclosure are not limited to the technical problems mentioned above, and other technical problems not mentioned will be clearly understood by those of ordinary skill in the art from the following description.

Technical Solution

A method according to an embodiment of the present disclosure for solving the above problems is performed by an electronic apparatus or an in-vehicle system, and is a method for generating training data of a deep learning model for lane classification by generating a composite image of the other color lane using images of a white lane and the other color lane, and includes determining a ratio of other two channels based on one channel (reference color channel) for three color channels of red (R), green (G) and blue (B) of the other color lane in the image of the other color lane; and generating a composite image of the other color lane by scaling the image of the white lane by applying the determined ratio to the other two channels with respect to the reference color channel of the white lane.

The reference color channel may have the largest color value among the three channels.

The other color lane may be a yellow lane, and the reference color channel may be an R channel.

The other color lane may be a blue lane, and the reference color channel may be a B channel.

The determining may include determining the ratio for each row for the other color lane having fading, and the generating may include applying the determined ratio for each row to each row of the white lane.

The determining may include determining the ratio for a plurality of other color lanes and determining an average value thereof, and the generating may include applying the ratio of the average value to the white lane.

The determining may include determining the ratio for each row with respect to the other color lane having fading, and determining the ratio for each row with respect to a plurality of other color lanes and determining an average value thereof, and the generating may include applying the determined average value of the ratio for each row to each row of the white lane.

The generating may include performing labeling on a corresponding color lane on the generated composite image of the other color lane.

An apparatus according to an embodiment of the present disclosure is an apparatus for generating training data of a deep learning model for lane classification, and includes a memory storing images of white lane and the other color lane; and a controller for generating a composite image of the other color lane, which is the training data, using the stored images of the white lane and the other color lane.

An apparatus according to another embodiment of the present disclosure is an apparatus for generating training data of a deep learning model for lane classification, and includes a communication unit for receiving images of white lane and the other color lane; and a controller for generating a composite image of the other color lane, which is the training data, using the received images of the white lane and the other color lane.

The controller may be configured to determine a ratio of other two channels based on one channel (reference color channel) for three color channels of red (R), green (G) and blue (B) of the other color lane in the image of the other color lane, and generate a composite image of the other color lane by scaling the image of the white lane by applying the determined ratio to the other two channels with respect to the reference color channel of the white lane.

The reference color channel may have the largest color value among the three channels.

The controller may be configured to determine the ratio for each row for the other color lane having fading, and apply the determined ratio for each row to each row of the white lane.

The controller may be configured to determine the ratio for a plurality of other color lanes to determine an average value thereof, and apply the ratio of the average value to the white lane.

The controller may be configured to determine the ratio for each row with respect to the other color lane having fading, and determine the ratio for each row with respect to a plurality of other color lanes to determine an average value thereof, and apply the determined average value of the ratio for each row to each row of the white lane.

The controller may be configured to perform labeling on a corresponding color lane on the generated composite image of the other color lane.

The apparatus according to an embodiment of the present disclosure may further include a camera for capturing images around a host vehicle, may use images around the vehicle captured by the camera, and may be applied as a system in the vehicle.

Advantageous Effects

The present disclosure configured as described above has an advantage in that it is possible to increase the training data of the other color lane in order to match the training data imbalance between the white lane and the other color lane for the deep learning model for color-based lane classification.

That is, according to the present disclosure, by generating a composite image of a blue and yellow lane having low frequency, it is possible to increase the training data of the corresponding lanes.

In addition, since the present disclosure converts the image of the white lane based on the ratio of the other color channel to the reference color channel among the RGB channels of the ratio reference lane, it has the advantage of being able to generate a composite image of the other color lane that is simpler and more realistic.

In addition, the present disclosure has an advantage in that it is possible to generate a composite image reflecting fading appearing in the image of the white lane.

In addition, the present invention has an advantage in that it can contribute to the creation of a deep learning model for lane classification in which classification performance such as classification accuracy is significantly improved by providing a relatively simple training data expansion technique.

The effects of the present disclosure are not limited to those mentioned above, and other effects not mentioned will be clearly understood by those of ordinary skill in the art from the following description.

BRIEF DESCRIPTION OF THE DRAWINGS

The above and other aspects, features, and advantages of the present disclosure will become more apparent to those of ordinary skill in the art by describing embodiments thereof in detail with reference to the accompanying drawings, in which.

DETAILED DESCRIPTION OF THE EMBODIMENTS

Figure 1:
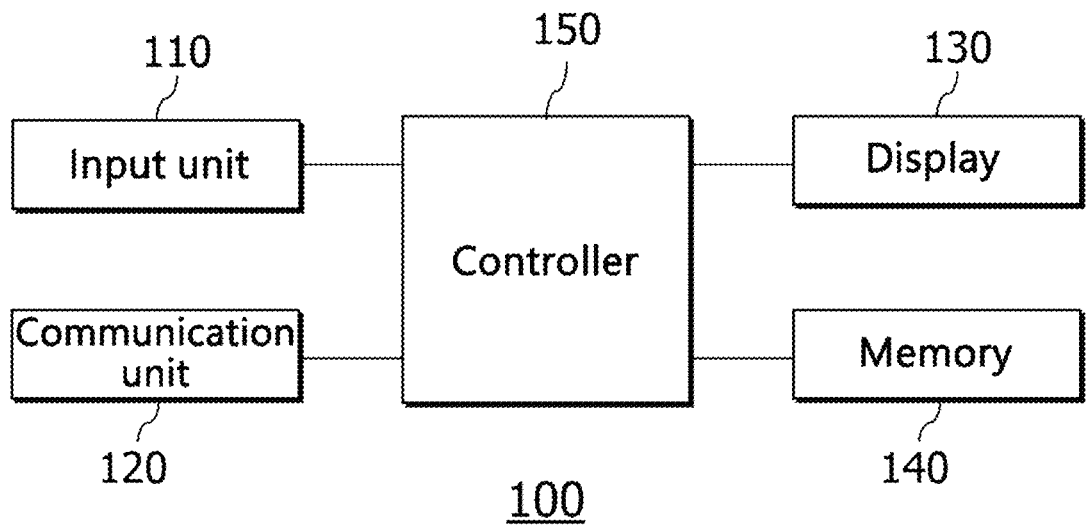
FIG. 1 shows a block diagram of an apparatus for generating 100 training data according to an exemplary embodiment of the present disclosure.

The present disclosure and method of accomplishing the same may become more apparent through the following detailed description in relation to the accompanying drawings, and accordingly, those of ordinary skill in the art will be able to easily implement the technical idea of the present disclosure. In addition, in describing the present disclosure, when it is determined that a detailed description of a related known technology may unnecessarily obscure the subject matter of the present disclosure, the detailed description will be omitted.

The terms used in this specification are for the purpose of describing embodiments only and are not intended to be limiting to the present disclosure. In this specification, the singular form also includes the plural form in some cases, unless specifically specified in the phrase. In this specification, terms such as "include", "comprise", "provide" or "have" do not exclude the presence or addition of one or more other elements other than elements mentioned.

In this specification, terms such as "or" and "at least one" may represent one of the words listed together or a combination of two or more. For example, "A or B" and "at least one of A and B" may include only one of A or B, or may also include both A and B.

In this specification, descriptions according to "for example", etc. may not exactly match the information presented, such as the recited properties, variables, or values, and effects such as modifications, including tolerances, measurement errors, limits of measurement accuracy, and other commonly known factors should not limit the modes for carrying out the invention according to the various exemplary embodiments of the present disclosure.

In this specification, when an element is described as being "connected" or "linked" to another element, it will be understood that it may be directly connected or linked to the other element, but intervening elements may also be present. On the other hand, when an element is referred to as being "directly connected" or "directly linked" to another element, it will be understood that there are no intervening elements present.

In this specification, when an element is described as being "on" or "adjacent to" another element, it will be understood that it may be directly "on" or "connected to" the other element but intervening elements may also be present. On the other hand, when an element is described as being "directly on" or "directly adjacent to" another element, it will be understood that there are no intervening elements present. Other expressions describing the relationship between the elements, for example, 'between' and 'directly between', and the like can be interpreted similarly.

In this specification, terms such as "first" and "second" may be used to describe various elements, but, the above elements should not be limited by the terms above. In addition, the above terms should not be construed as limiting the order of each component, and may be used for the purpose of distinguishing one element from another. For example, "first element" may be named as "second element" and similarly, "second element" may also be named as "first element."

Unless otherwise defined, all terms used in this specification may be used with meanings commonly understood by those of ordinary skill in the art. In addition, terms defined in a commonly used dictionary are not interpreted ideally or excessively unless explicitly and specifically defined.

Hereinafter, a preferred embodiment according to the present disclosure will be described in detail with reference to the accompanying drawings.

FIG. 1 shows a block diagram of an apparatus 100 for generating training data according to an exemplary embodiment of the present disclosure.

The apparatus 100 for generating training data according to an embodiment of the present disclosure is an apparatus for generating training data used during learning (or training) of a deep learning model for lane classification. In this case, the deep learning model is a model that is learned according to various deep learning techniques.

In this case, the deep learning model expresses the relationship between input data and output data in multiple layers, and these multiple representation layers are also referred to as "neural network". Each layer in the neural network consists of at least one filter, and each filter has a matrix of weights. That is, each element (pixel) in the matrix of the corresponding filter may correspond to a weight value.

For example, deep learning techniques may include Deep Neural Network (DNN), Convolutional Neural Network (CNN), Recurrent Neural Network (RNN), Restricted Boltzmann Machine (RBM), Deep Belief Network (DBN), Deep Q-Networks, Auto-encoder, Variational Auto-encoder, and the like, but are not limited thereto.

The deep learning model for lane classification is a model trained according to deep learning techniques to classify the color of the lane in an image containing the lane. Of course, the deep learning model for lane classification may additionally classify the type of the lane (e.g., dotted line, solid line, etc.) in addition to the color of the corresponding lane.

Meanwhile, in order to learn (or train) a deep learning model with good performance, such as having high accuracy, various and large amounts of training data are required. However, collecting diverse and dense data representing all scenarios is not an easy task.

In particular, a deep learning model for lane classification needs to be trained with many identical or similar amounts of images for white lanes and other color lanes. In this case, the white lane may indicate unidirectional traffic, the yellow lane may indicate bidirectional traffic, and the blue lane may indicate special traffic, but is not limited thereto.

However, since there are many white lanes and relatively few lanes of other colors (e.g., yellow lane, blue lane, etc.) on the actual road, the training data for learning the deep learning model for lane classification is inevitably imbalanced. That is, since it is ubiquitous in the case of images of the white lane, many images can be easily collected, but only a few images of the yellow and blue lanes have to be collected compared to the white lane due to limited availability. Accordingly, a deep learning model trained using such training data tends to be biased toward frequently occurring scenarios. In addition, when a deep learning model is trained with such unbalanced training data, prediction inequality occurs. That is, the prediction performance (accuracy, etc.) of lanes of other colors is inevitably quite lower than that of white lanes. Also, this imbalance is more prevalent in color-based lane classification problems using semantic segmentation deep learning models.

The apparatus for generating 100 may provide a solution to the training data imbalance problem in color-based lane classification by providing a new training data augmentation technique. In this case, the training data increase is a strategy of manipulating the available training data to increase the imbalanced training data to achieve a balance.

Such apparatus for generating 100 is an electronic apparatus capable of computing for augmenting training data with respect to unbalanced training data (images of white lanes and other color lanes, with more white lane images) by generating a composite image of the other color lane using the image of the corresponding lane, and may include an input unit 110, communication unit 120, a display 130, a memory 140, and a controller 150, as shown in FIG. 1.

Of course, the apparatus for generating 100 may be an apparatus for training a deep learning model for lane classification. In this case, the apparatus for generating 100 may train the deep learning model for lane classification by using the composite image of the lane generated by itself in addition to the image of the lane.

Meanwhile, the apparatus for generating 100 may be provided in the vehicle or may be provided separately from the vehicle. In this case, the vehicle may be an intelligent vehicle including an autonomous driving system or the like. That is, the intelligent vehicle refers to a vehicle in which driving operations such as driving, stopping, rotating, accelerating or decelerating are automatically performed by a computer or the like without a driver directly operating the vehicle.

For example, the apparatus for generating 100 provided separately from the vehicle may include a desktop PC (personal computer), a laptop PC (personal computer), a tablet personal computer, a netbook computer, a workstation, a personal digital assistant (PDA), a smartphone, a smart pad, or a mobile phone, but is not limited thereto.

The input unit 110 generates input data in response to various user inputs, and may include various input means. For example, the input unit 110 may include a keyboard, a keypad, a dome switch, a touch panel, a touch key, a touchpad, a mouse, a menu button, and the like, but is not limited thereto.

The communication unit 120 is configured to communicate with other devices. For example, the communication unit 120 may perform wireless communication such as 5th generation communication (5G), long term evolution-advanced (LTE-A), long term evolution (LTE), Bluetooth, Bluetooth low energy (BLE), near field communication (NFC), and Wi-Fi communication, or may perform wired communication such as cable communication, but is not limited thereto. For example, the communication unit 120 may receive an image of a lane or the like from another device, and may transmit a generated composite image of the lane to another device.

The display 130 displays various image data on a screen, and may be configured as a non-emission panel or a light emitting panel. For example, the display unit 130 may include a liquid crystal display (LCD), a light emitting diode (LED) display, an organic light emitting diode (OLED) display, a micro electro mechanical systems (MEMS) display, or an electronic paper display, but is not limited thereto. In addition, the display 130 may be combined with the input unit 110 to be implemented as a touch screen, etc.

The memory 140 stores various types of information necessary for the operation of the apparatus for generating 100. The stored information may include, but is not limited to, an image of a lane, a composite image of a lane, and program information related to a method for generating to be described later. For example, the memory 140 may include, but is not limited to, a hard disk type, a magnetic media type, a compact disc read only memory (CD-ROM), an optical media type, a magneto-optical media type, a multimedia card micro type, flash memory type, ROM type (read only memory type), or RAM type (random access memory type) and the like depending on the type. In addition, the memory 140 may be a cache, a buffer, a main memory, an auxiliary memory, or a separately provided storage system according to its purpose/location, but is not limited thereto.

The controller 150 may perform various control operations of the apparatus for generating 100. That is, the controller 150 may control the execution of a method for generating to be described later, and may control the operation of the remaining components of the apparatus for generating 100, that is, the input unit 110, the communication unit 120, the display 130, the memory 140, and the like. For example, the controller 150 may include, but is not limited to, a processor that is hardware or a process that is software that is executed in a corresponding processor.

Figure 2:
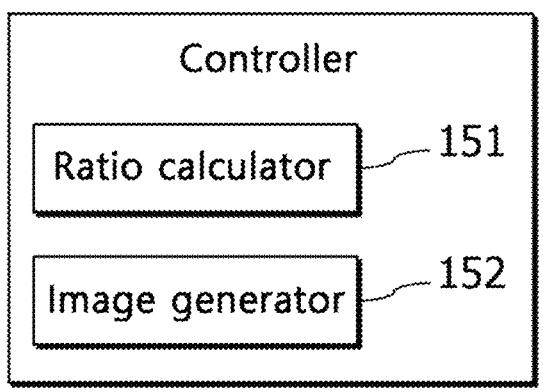
FIG. 2 shows a block diagram of a controller 150 in the apparatus for generating 100 according to an exemplary embodiment of the present disclosure.

FIG. 2 shows a block diagram of a controller 150 in the apparatus for generating 100 according to an exemplary embodiment of the present disclosure.

The controller 150 may control the execution of a method for generating according to an embodiment of the present disclosure, and as shown in FIG. 2, may include a ratio calculator 151 and an image generator 152. For example, the ratio calculator 151 and the image generator 152 may be a hardware configuration of the controller 150 or a software process performed by the controller 150, but are not limited thereto.

Hereinafter, the method for generating according to the present disclosure will be described in more detail. However, for convenience of description, it will be described that the other color lane is a blue lane or yellow lane, but the present disclosure is not limited thereto, and they may be lanes of other colors.

Figure 3:
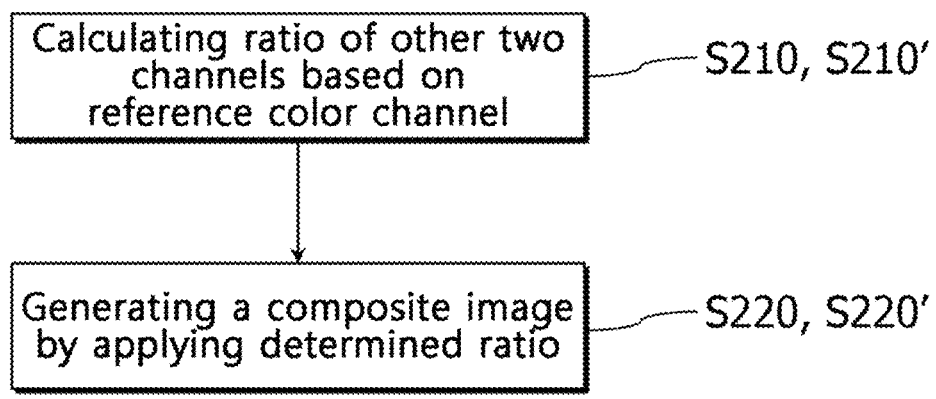
FIG. 3 shows a flowchart of a method for generating according to an exemplary embodiment of the present disclosure.
Figure 4:
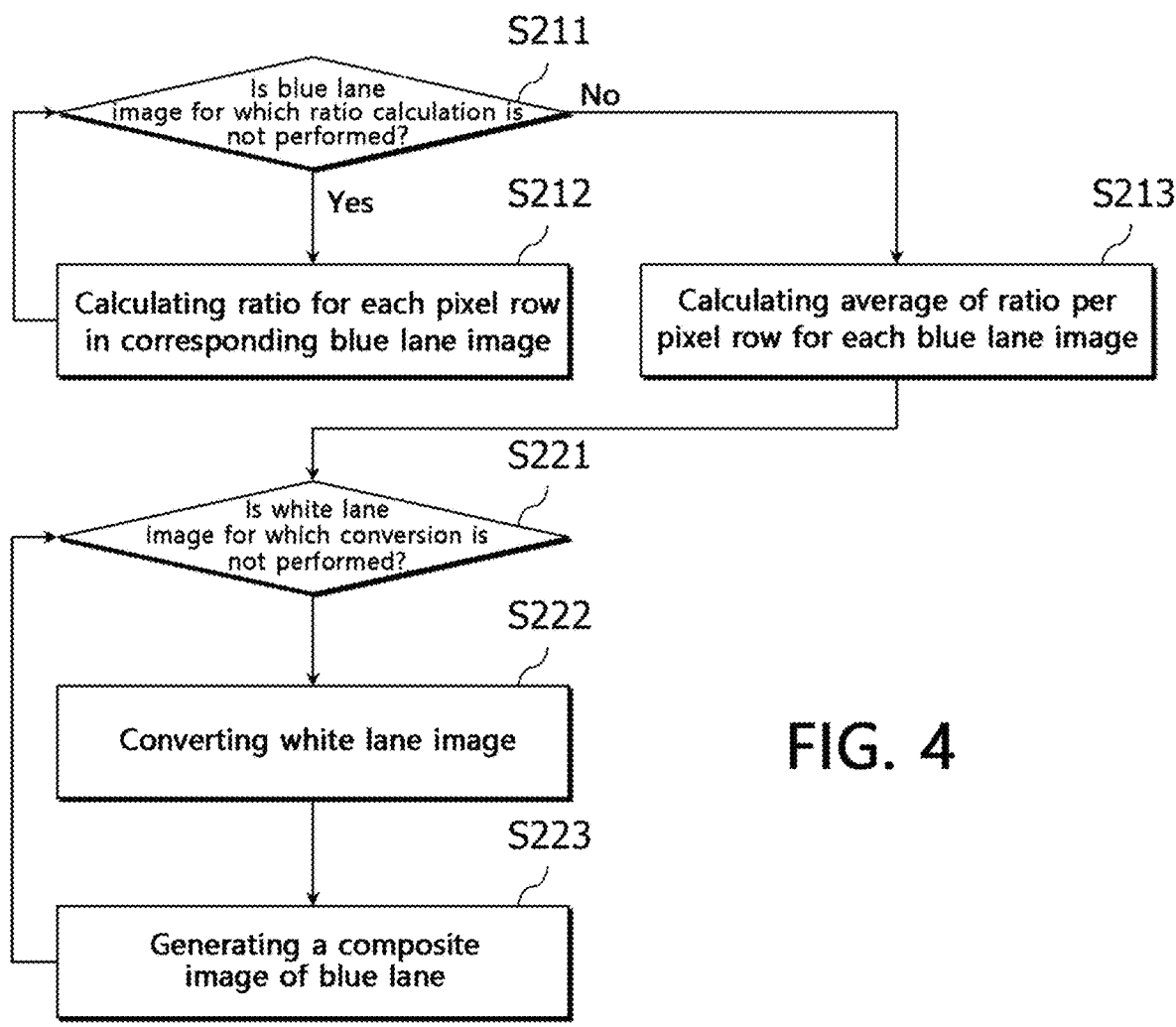
FIG. 4 shows a more detailed flowchart for generating a composite image of a blue lane.
Figure 5:
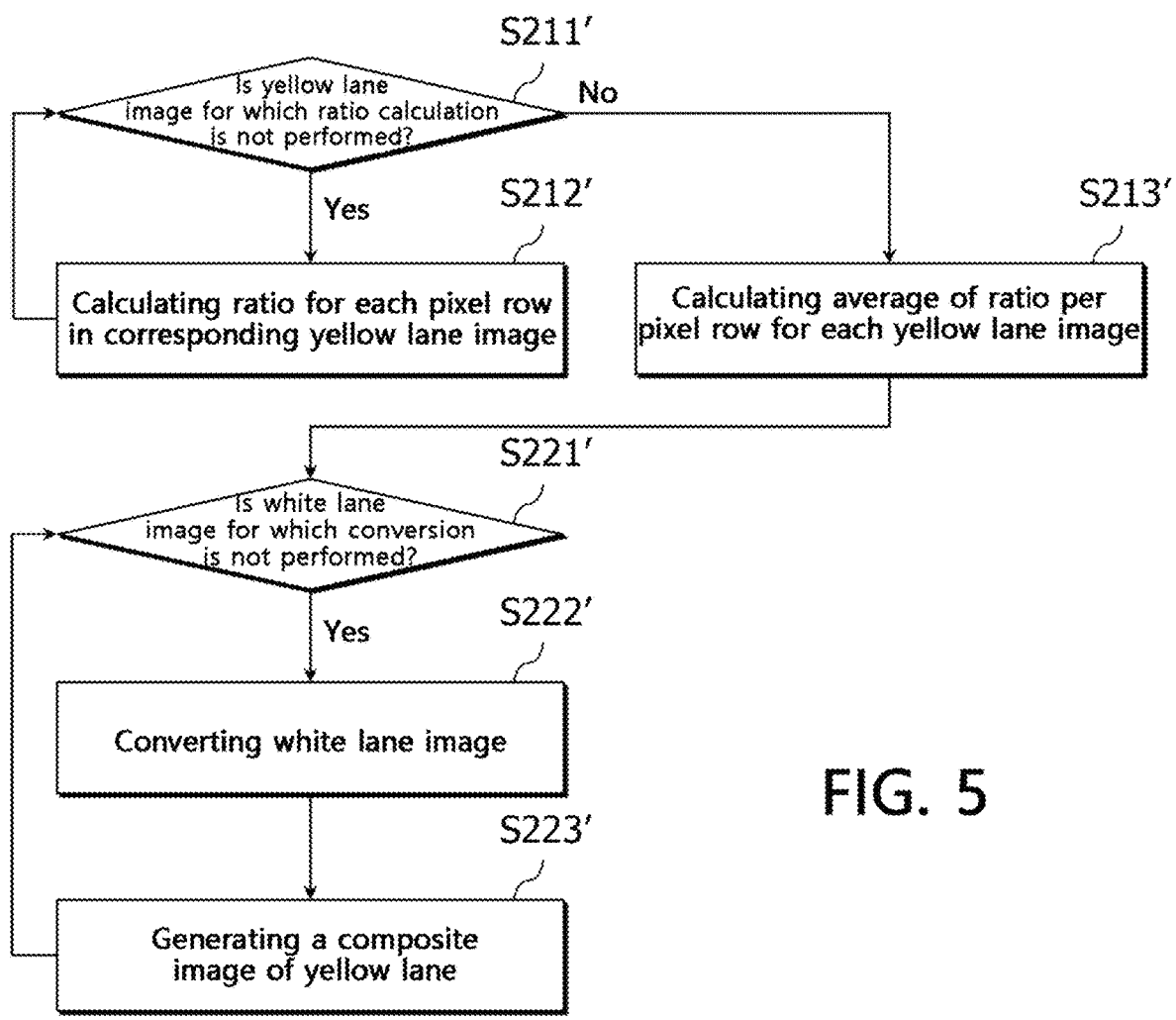
FIG. 5 shows a more detailed flowchart for generating a composite image of a yellow lane.

FIG. 3 shows a flowchart of a method for generating according to an exemplary embodiment of the present disclosure. FIG. 4 shows a more detailed flowchart for generating a composite image of a blue lane, and FIG. 5 shows a more detailed flowchart for generating a composite image of a yellow lane.

The method for generating according to an embodiment of the present disclosure is a method for generating training data of a deep learning model for lane classification by generating a composite image of the other color lane using images of a white lane and the other color lane, and as shown in FIG. 3, may include S210 and S220 (S210' and S220'). That is, the method for generating the composite image of the blue lane may include S210 and S220, and the method for generating the composite image of the yellow lane may include S210' and S220'.

First, in S210 (S210'), for three color channels of red (R), green (G) and blue (B) of the other color lane (hereinafter, referred to as a "ratio reference lane") in the image (hereinafter, referred to as a "ratio reference image") of the other color lane (e.g., a blue lane or a yellow lane), the ratio calculator 151 determines the ratio of the other two channels based on one channel (reference color channel). In this case, the reference color channel is the channel that contributes the most to the corresponding color lane (i.e., ratio reference lane) on the image, and may have the largest color value (RGB value) among the three channels.

For example, if the ratio reference image includes a blue ratio reference lane, the reference color channel is the B channel. This is because the B channel is the channel having the largest color value with the highest contribution to the blue ratio reference lane on the image. That is, in the image of the blue lane, the ratio of the three color channels of the corresponding blue lane portion is calculated, wherein the ratio of each color value of the R channel and the G channel to the color value of the B channel, which is the reference color channel, is calculated. In this case, the blue lane portion includes a plurality of pixels, and since each pixel has color values (i.e., RGB values) of three color channels, an average of color values of each color channel in these pixels may be calculated. Then, for the three calculated average values, the ratio of each average value of the other two channels (that is, the R channel and the G channel) to the average value of the B channel is calculated. For example, if the average color values of the R, G, and B channels of pixels in the blue lane portion are 10, 9, and 200, respectively, with respect to the B channel the R channel ratio is 10/200, and the G channel ratio is 9/200 (hereinafter referred to as "first example").

In addition, if the ratio reference image includes a yellow ratio reference lane, the reference color channel is the R channel. This is because the R channel is the channel having the largest color value with the highest contribution to the yellow ratio reference lane on the image. That is, in the image of the yellow lane, the ratio of the three color channels of the corresponding yellow lane portion is calculated, wherein the ratio of each color value of the G channel and the B channel to the color value of the R channel, which is the reference color channel, is calculated. In this case, the yellow lane portion includes a plurality of pixels, and since each pixel has color values (i.e., RGB values) of three color channels, an average of color values of each color channel in these pixels may be calculated. Then, for the three calculated average values, the ratio of each average value of the other two channels (that is, the G channel and the B channel) to the average value of the R channel is calculated. For example, if the average color values of the R, G, and B channels of pixels in the yellow lane portion are 150, 13, and 15, respectively, with respect to the R channel the G channel ratio is 13/150, and the B channel ratio is 15/150 (hereinafter referred to as "second example").

Then, in S220 (S220'), the image generator 152 generates a composite image of the other color lane by scaling the image of the white lane by applying the ratio calculated in S210 (S210') to the other two channels with respect to the reference color channel of the white lane.

For example, in the first example, since the reference color channel is the B channel, the R channel ratio (10/200) and the G channel ratio (9/200) with respect to the B channel for the white lane portion in the white lane image are applied. That is, in the white lane image, the white lane portion includes a plurality of pixels, and each pixel has color values (i.e., RGB values) of three color channels. In this case, in each pixel, the B channel is left as it is, and color values are converted for the remaining R and G channels, wherein the above-described conversion is performed by scaling according to the already derived R channel ratio (10/200) and G channel ratio (9/200), and through this, a composite image of the blue lane may be generated. For example, if the RGB value of any pixel in the white lane portion in the white lane image is (200, 199, 198), the color value 198 of the B channel is left as it is, and by scaling the R channel to convert it to a color value of 200× (10/200), and scaling the G channel to convert it to a color value of 199× (9/200), the corresponding pixel may be converted to any one pixel in the blue lane. Of course, by performing the same conversion on the remaining pixels of the white lane, a composite image of the blue lane may be generated.

In addition, in the second example, since the reference color channel is the R channel, the G channel ratio (13/150) and the B channel ratio (15/150) with respect to the R channel for the white lane portion in the white lane image are applied. That is, in the white lane image, the white lane portion includes a plurality of pixels, and each pixel has color values (i.e., RGB values) of three color channels. In this case, in each pixel, the B channel is left as it is, and color values are converted for the remaining R and G channels, wherein the above-described conversion is performed by scaling according to the already derived G channel ratio (13/150) and B channel ratio (15/150), and through this, a composite image of the yellow lane may be generated. For example, if the RGB value of any pixel in the white lane portion in the white lane image is (240, 241, 242), the color value 240 of the R channel is left as it is, and by scaling the G channel to convert it to a color value of 241× (13/150), and scaling the B channel to convert it to a color value of 242× (15/150), the corresponding pixel may be converted to any one pixel in the yellow lane. Of course, by performing the same conversion on the remaining pixels of the white lane, a composite image of the yellow lane may be generated.

Of course, in S210 (S210'), a plurality of ratio reference images may be used. In this case, in S210 (S210'), the above-described ratio is calculated for each of the ratio reference images, and an average value of the ratio is calculated. Then, in S220 (S220'), a composite image is generated by performing the above-described conversion on the image of the white lane using the average value of the calculated ratio.

For example, when using two ratio reference images, in S210 (S210'), after calculating the ratio (first ratio) to the first ratio reference image and the ratio (second ratio) to the second ratio reference image, an average value of the first and second ratios is calculated. Then, in S220 (S220'), a composite image is generated by performing the above-described conversion on the image of the white lane using the average value of the calculated first and second ratios.

Meanwhile, in the ratio reference image, the ratio reference lane portion may not have a constant RGB value, but may have fading such as gradation. In this case, fading refers to a color of a ratio reference lane composed of a plurality of pixel rows gradually becoming lighter as the pixel row moves in one direction (or the pixel row moves outward) in the ratio reference image.

In order to generate a composite image in which such fading is more clearly reflected, in S210 (S210'), the above-described ratio may be calculated for each pixel row with respect to the ratio reference lane in the ratio reference image. Then, in S220 (S220'), the above-described conversion is performed using the calculated ratio for each pixel row to generate a composite image.

For example, if the ratio reference image having fading includes three pixel rows, in S210 (S210'), an average ratio of pixels in a first pixel row (a first row ratio), an average ratio of pixels in a second pixel row (a second row ratio), and an average ratio of pixels in a third pixel row (a third row ratio) are calculated. Then, in S220 (S220'), the above-described conversion is performed according to the calculated ratio for each row of the white lane in the image of the white lane using the calculated first to third row ratios to generate a composite image. That is, the above-described conversion is performed by applying the first row ratio to the first pixel row of the white lane, the above-described conversion is performed by applying the second row ratio to the second pixel row of the white lane, and the above-described conversion is performed by applying the third row ratio to the third pixel row of the white lane.

In particular, a plurality of ratio reference images may be used while simultaneously reflecting fading. In this case, in S210 (S210'), a ratio is calculated for each pixel row with respect to the ratio reference lane having fading, and a ratio is calculated for each pixel row for a plurality of ratio reference lanes, and an average value thereof is calculated. Then, in S220 (S220'), a composite image may be generated by performing the above-described conversion by applying the average value of the ratio of each pixel row calculated for each pixel row of the white lane. This can be described in more detail with reference to FIGS. 4 and 5.

That is, referring to FIGS. 4 and 5, S210 (S210') may include S211 to S213 (S211' to S213'), and S220 (S220') may include S221 to S223 (S221' to S223'), and this represents a case in which a plurality of ratio reference images are used and fading is reflected at the same time. However, since the content of FIG. 5 is the same, except that "blue" is replaced with "yellow" in FIG. 4, only FIG. 4 will be described below.

First, in S211, it is determined whether there is an image of the blue lane to which the ratio is not yet reflected among a plurality of blue lane images (i.e., ratio reference images). That is, in S210, a plurality of blue lane images having fading are sequentially selected one by one to calculate a ratio according to the selected blue lane image, while in S211, it is determined whether an image of the blue lane for which this calculation has not been performed still exists. If the corresponding image of the blue lane exists, S212 is performed, and if not, S213 is performed.

In S212, in the image of one blue lane for which the ratio is not calculated, a ratio is calculated for each pixel row for the corresponding blue lane, and when the calculation is completed, the process returns to S211. Accordingly, a ratio can be calculated for each pixel row for all the blue lane images.

Then, in S221, it is determined whether there is an image of a white lane that has not yet been converted according to the ratio application among the plurality of images of the white lane. That is, in S220, a plurality of white lane images are sequentially selected one by one to perform blue lane conversion by applying the ratio calculated in S213 to the image of the selected white lane, while in S221, it is determined whether an image of the white lane for which this conversion has not been performed still exists. If the corresponding image of the white lane exists, S222 is performed, and if not, it ends.

Then, in S222, in the image of one white lane for which no conversion according to the application of the ratio has been performed, the corresponding white lane is converted into a blue lane by applying the average value of the ratio for each pixel row calculated in S213 for each pixel row.

Then, in S223, a composite image of the blue lane according to the conversion of S222 is generated, and when the generation of the composite image is completed, the process returns to S221. Accordingly, it is possible to generate a composite image of the blue lane according to the application of the ratio to the images of all the white lanes.

Meanwhile, in S220 (S220'), the image generator 152 may perform labeling on a corresponding color lane on the generated composite image of the other color lane. For example, when a composite image of a blue lane is generated according to the first example, a label of the blue lane may be assigned to the composite image. In addition, when a composite image of a yellow lane is generated according to the second example, a label of the yellow lane may be assigned to the composite image. The label assigned according to this labeling may be used as a result value (label) of the training data in the training of deep learning performed using the corresponding composite image later.

Figure 6A:
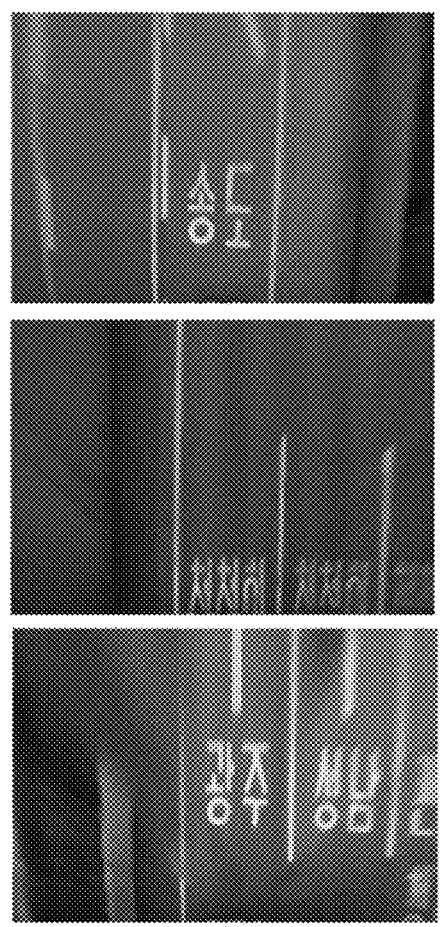
FIGS. 6A-6C show an image of a white lane, a composite image of a blue lane and a composite image of a yellow lane generated using the method for generating of the present disclosure, respectively.
Figure 6B:
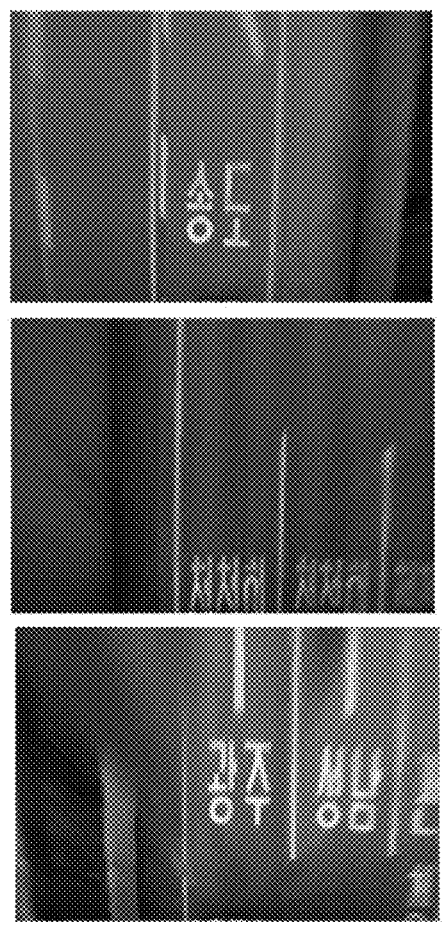
Figure 6C:
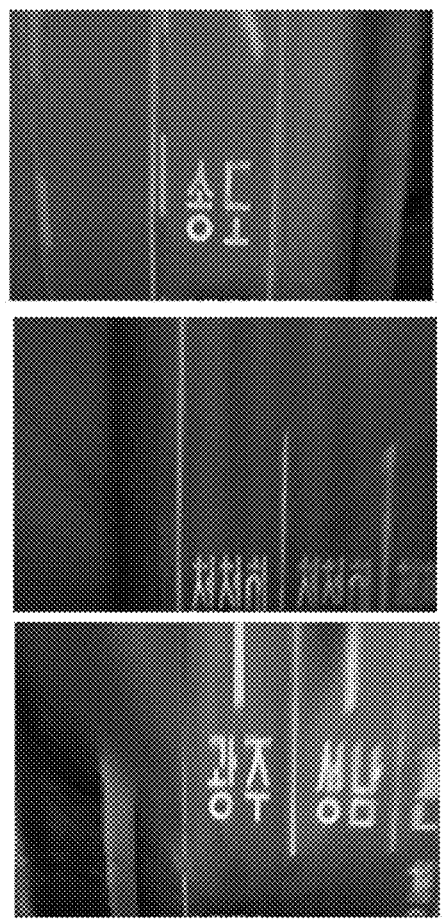
Figure 7:
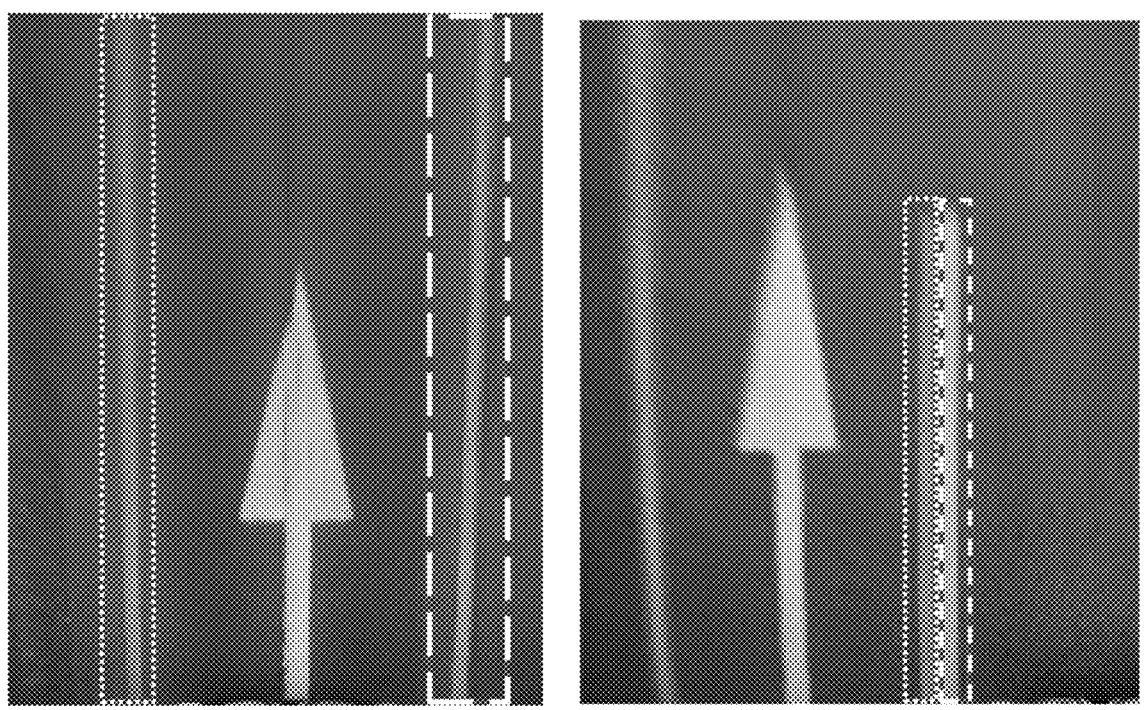
FIG. 7 shows an original lane and a lane generated using the method for generating of the present disclosure.
Figure 8:
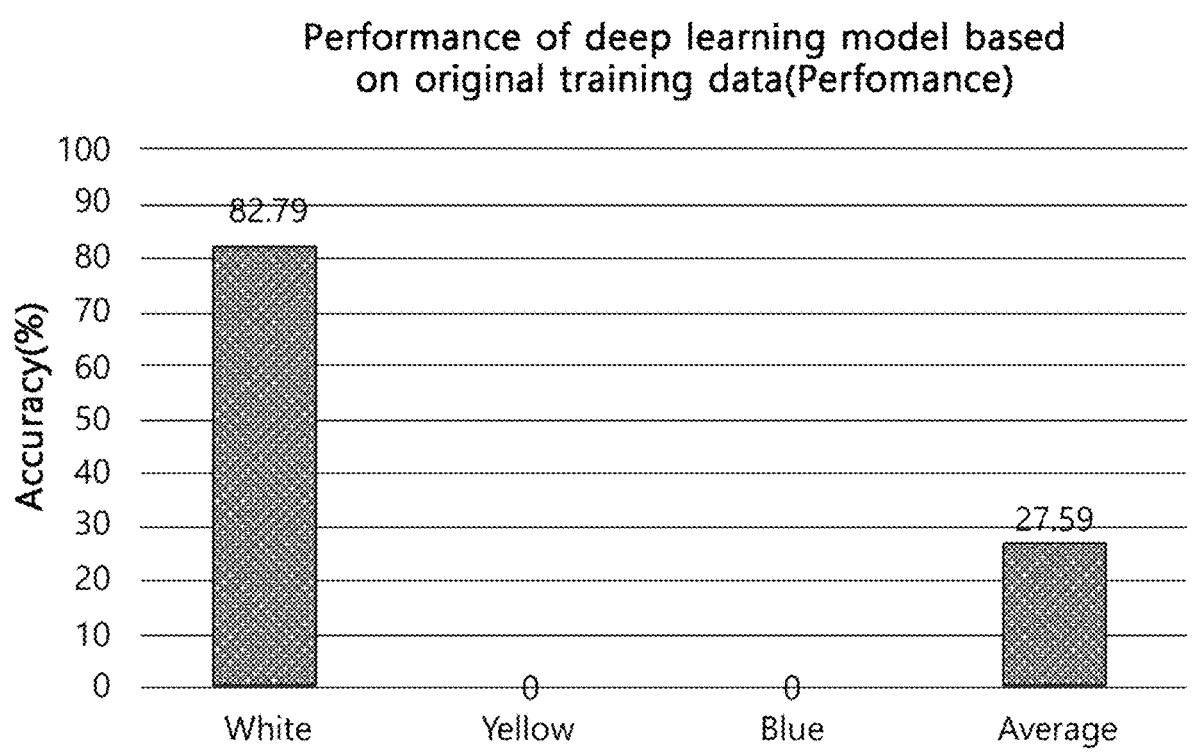
FIG. 8 shows a performance graph of a deep learning model trained using the original training data.

FIG. 6a shows an image of a white lane, FIG. 6b shows a composite image of a blue lane generated using the method for generating of the present disclosure with respect to FIG. 6a, and FIG. 6c shows a composite image of a yellow lane generated using the method for generating of the present disclosure with respect to FIG. 6a. In addition, FIG. 7 shows an original lane (short dashed box) and a lane (long dashed box) generated using the method for generating of the present disclosure. In addition, FIG. 8 shows a performance graph of a deep learning model trained using the original training data, and FIG. 9 shows a performance graph of a deep learning model trained using training data increased according to the method for generating of the present disclosure.

Figure 9:
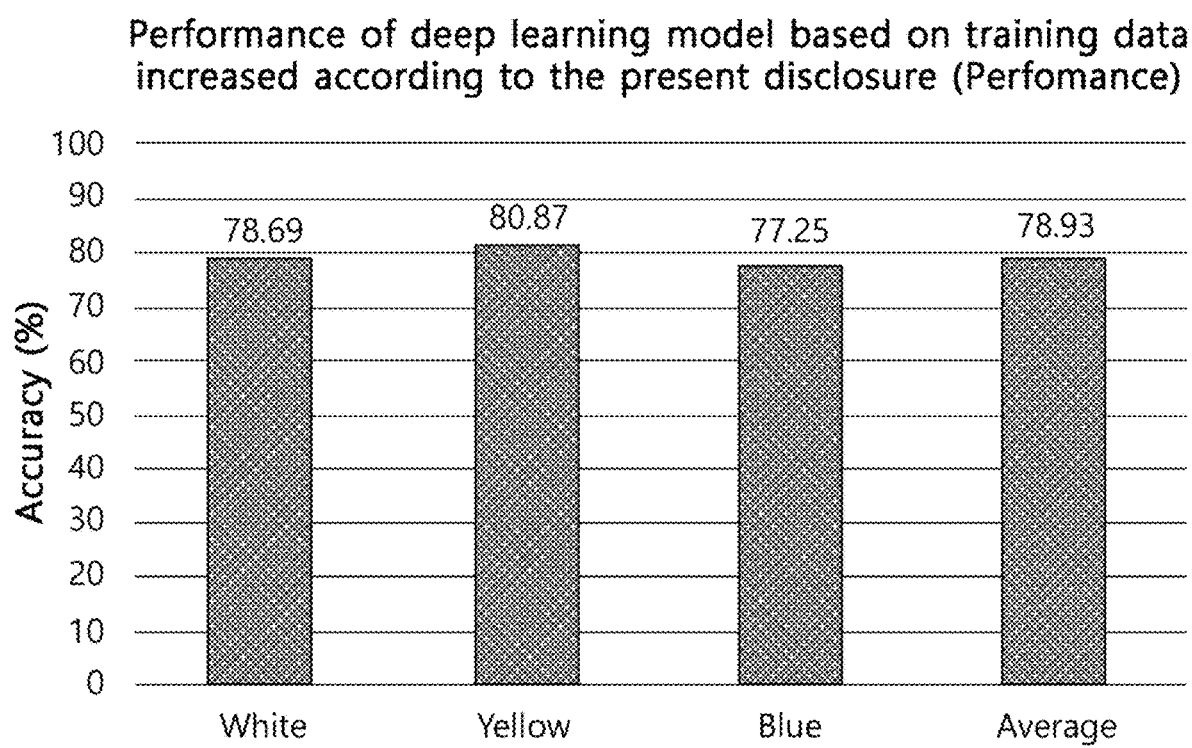
FIG. 9 shows a performance graph of a deep learning model trained using training data increased according to the method for generating of the present disclosure.

Referring to FIGS. 6 to 9, it can be seen that the method for generating according to the present disclosure can generate a composite image having characteristics very similar to the ratio reference lane (e.g., blue lane or yellow lane) for the image of the white lane. Accordingly, the present disclosure can balance the training data of the white, yellow, and blue lanes that were unbalanced so that the distribution becomes uniform. In particular, referring to FIG. 8, even though the latest deep learning algorithm is used, there was a problem that the performance such as classification accuracy for blue and yellow lanes was very poor when learning through the original imbalanced training data. On the other hand, when using the same deep learning algorithm and learning through the training data generated by the augmentation technology according to the present disclosure, as shown in FIG. 9, classification accuracy (performance) for blue and yellow lanes can be greatly improved.

The above-described method for generating may be executed by being loaded into the memory 140 and executing a program under the control of the controller 150. Such programs may be stored in memory 140 of various types of non-transitory computer readable media. Non-transitory computer-readable media include various types of tangible storage media.

For example, non-transitory computer-readable media include, but are not limited to, magnetic recording media (e.g., flexible disk, magnetic tape, hard disk drive), magneto-optical recording media (e.g., magneto-optical disk), CD-ROM (read only memory), CD-R, CD-R/W, semiconductor memory (e.g., mask ROM, programmable ROM (PROM), erasable PROM (EPROM), flash ROM, random access memory (RAM)).

In addition, the program may be supplied by various types of transitory computer readable media. For example, the transitory computer-readable medium may include, but is not limited to, an electrical signal, an optical signal, and an electromagnetic wave. That is, the temporary computer-readable medium may supply the program to the controller 150 through a wired communication path such as an electric wire or optical fiber or a wireless communication path.

Figure 10:
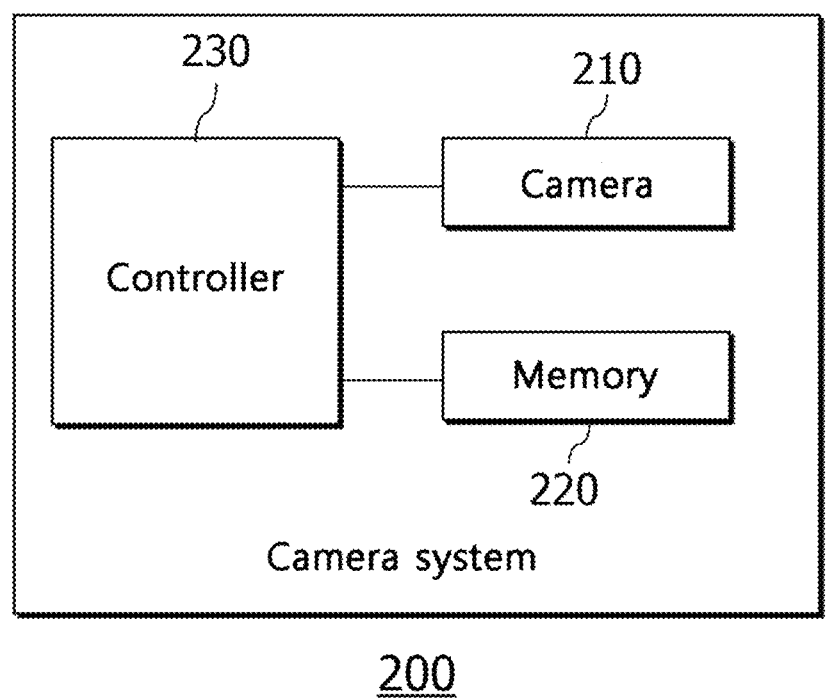
FIG. 10 shows a block diagram of an in-vehicle camera system 200 according to an exemplary embodiment of the present disclosure.

FIG. 10 shows a block diagram of an in-vehicle camera system 200 according to an exemplary embodiment of the present disclosure.

Meanwhile, the camera system 200 is a system provided in a vehicle, and is a system that performs various controls on a camera 210 or various controls using images around a host vehicle captured by the camera 210. The camera system 200 includes a camera 210 such as for optics, a memory 220 that stores various information such as images captured by the camera 210, and a controller 230 that performs control using the information in the memory 220. That is, the camera system 200 may be a system in which the above-described apparatus for generating 100 is applied as an in-vehicle system.

In this case, the camera 210 may be an optical camera or the like, and may capture various images around a host vehicle including a lane. In addition, the memory 220 and the controller 230 may perform the above-described functions and the above-described method for generating in correspondence with the memory 140 and the controller 150 of the above-described apparatus for generating 100, and since these have already been described, they will be omitted below. In addition, the camera system 200 may include the input unit 110, the communication unit 120, the display 130, etc. of the apparatus for generating 100 described above in addition to the camera 210, the memory 220, and the controller 230 and, since they have already been described, they will be omitted below.

The present disclosure configured as described above has an advantage in that it is possible to increase the training data of the other color lane in order to match the training data imbalance between the white lane and the other color lane for the deep learning model for color-based lane classification. That is, according to the present disclosure, by generating a composite image of a blue and yellow lane having low frequency, it is possible to increase the training data of the corresponding lanes. In addition, since the present disclosure converts the image of the white lane based on the ratio of the other color channel to the reference color channel among the RGB channels of the ratio reference lane, it has the advantage of being able to generate a composite image of the other color lane that is simpler and more realistic. In addition, the present disclosure has an advantage in that it is possible to generate a composite image reflecting fading appearing in the image of the white lane. In addition, the present invention has an advantage in that it can contribute to the creation of a deep learning model for lane classification in which classification performance such as classification accuracy is significantly improved by providing a relatively simple training data expansion technique.

In the detailed description of the present disclosure, although specific embodiments have been described, it is apparent that various modifications are possible without departing from the scope of the present disclosure. Therefore, the scope of the present disclosure is not limited to the described embodiments, and should be defined by the following claims and their equivalents.

DESCRIPTION OF SYMBOLS

| | |
|---|---|
| 100: apparatus for generating | 110: input unit |
| 120: communication unit | 130: display |
| 140: memory | 150: controller |
| 151: ratio calculator | 152: image generator |

What is claimed is:

1. A method for generating training data of a deep learning model for lane classification by generating a composite image of the other color lane using images of a white lane and the other color lane, the method performed by an electronic apparatus or an in-vehicle system and comprising:
    determining a ratio of other two channels based on one channel (reference color channel) for three color channels of red (R), green (G) and blue (B) of the other color lane in the image of the other color lane; and
    generating a composite image of the other color lane by scaling the image of the white lane by applying the determined ratio to the other two channels with respect to the reference color channel of the white lane.

2. The method of claim 1, wherein the reference color channel has the largest color value among the three channels.

3. The method of claim 1, wherein the other color lane is a yellow lane and the reference color channel is an R channel.

4. The method of claim 1, wherein the other color lane is a blue lane and the reference color channel is a B channel.

5. The method of claim 1,
    wherein the determining comprises determining the ratio for each row for the other color lane having fading, and
    the generating comprises applying the determined ratio for each row to each row of the white lane.

6. The method of claim 1,
    wherein the determining comprises determining the ratio for a plurality of other color lanes and determining an average value thereof, and
    the generating comprises applying the ratio of the average value to the white lane.

7. The method of claim 1,
    wherein the determining comprises determining the ratio for each row with respect to the other color lane having fading, and determining the ratio for each row with respect to a plurality of other color lanes and determining an average value thereof, and
    the generating comprises applying the determined average value of the ratio for each row to each row of the white lane.

8. The method of claim 1, wherein the generating comprises performing labeling on a corresponding color lane on the generated composite image of the other color lane.

9. An apparatus for generating training data of a deep learning model for lane classification, comprising:
    a memory storing images of white lane and the other color lane; and
    a controller for generating a composite image of the other color lane, which is the training data, using the stored images of the white lane and the other color lane,
    wherein the controller is configured to:
    determine a ratio of other two channels based on one channel (reference color channel) for three color channels of red (R), green (G) and blue (B) of the other color lane in the image of the other color lane, and
    generate a composite image of the other color lane by scaling the image of the white lane by applying the determined ratio to the other two channels with respect to the reference color channel of the white lane.

10. The apparatus of claim 9, wherein the reference color channel has the largest color value among the three channels.

11. The apparatus of claim 9, wherein the controller is configured to:
    determine the ratio for each row for the other color lane having fading, and
    apply the determined ratio for each row to each row of the white lane.

12. The apparatus of claim 9, wherein the controller is configured to:
    determine the ratio for a plurality of other color lanes to determine an average value thereof, and
    apply the ratio of the average value to the white lane.

13. The apparatus of claim 9, wherein the controller is configured to:
    determine the ratio for each row with respect to the other color lane having fading,
    determine the ratio for each row with respect to a plurality of other color lanes to determine an average value thereof, and
    apply the determined average value of the ratio for each row to each row of the white lane.

14. The apparatus of claim 9, wherein the controller is configured to perform labeling on a corresponding color lane on the generated composite image of the other color lane.

15. The apparatus of claim 9, further comprising a camera for capturing images around a host vehicle, and
    using images around the vehicle captured by the camera and being applied as a system in the vehicle.

16. An apparatus for generating training data of a deep learning model for lane classification, comprising:
    a communication unit for receiving images of white lane and the other color lane; and
    a controller for generating a composite image of the other color lane, which is the training data, using the received images of the white lane and the other color lane,
    wherein the controller is configured to:
    determine a ratio of other two channels based on one channel (reference color channel) for three color channels of red (R), green (G) and blue (B) of the other color lane in the image of the other color lane, and generate a composite image of the other color lane by scaling the image of the white lane by applying the determined ratio to the other two channels with respect to the reference color channel of the white lane.

* * * * *